July 13, 1954
T. A. ST. CLAIR
2,683,464
RELIEF VALVE SEAL
Filed July 24, 1952
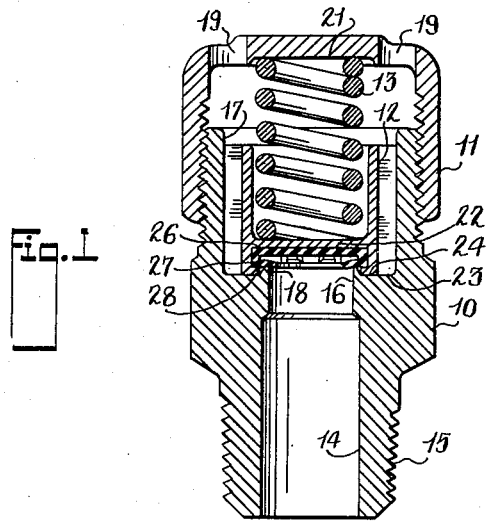
Fig. 1
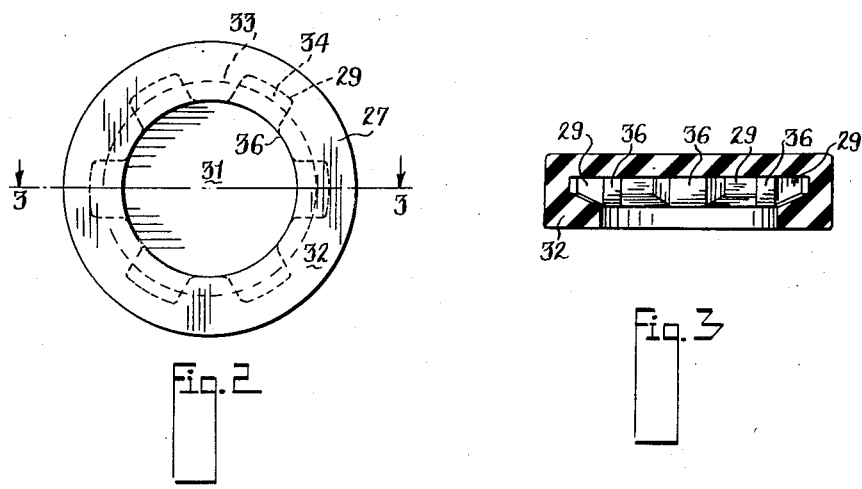
Fig. 2
Fig. 3
INVENTOR.
THEODORE A. ST. CLAIR
BY
RICHEY, WATTS, EDGERTON & McNENNY
ATTORNEYS

Patented July 13, 1954

2,683,464

UNITED STATES PATENT OFFICE 2,683,464

RELIEF VALVE SEAL

Theodore A. St. Clair, South Euclid, Ohio, assignor to The Weatherhead Company, Cleveland, Ohio, a corporation of Ohio Application July 24, 1952, Serial No. 300,676

1 Claim. (Cl. 137—540)

This invention relates to pressure relief valves, and is particularly directed to pressure relief or safety valves employed in installations containing gases such as liquified petroleum gas or other explosive or poisonous gases, the escape of small amounts of which might be dangerous.

Valves designed for the aforesaid type of service generally employ a resilient seat or sealing member in order to insure the provision of a perfect seal and completely prevent all escape of gases under pressure through the relief valve except when opened by excess pressure.

In many installations, such as liquified petroleum gas storage systems, requirements are relatively severe as to the maintenance of the opening pressure at the specified value. With conventional valves having resilient seats which receive the full load of the calibrated closing spring when the valve is closed, the characteristics of the valve may change between the time it is set at the factory and the time it is subjected in actual service to the set pressure.

The aforesaid change in a conventional valve is caused by excessive stresses in the resilient seat when operated at pressure below the pressure setting, because in such valves, as the pressure decreases the unit loading on the resilient seat increases. For example, in certain widely used systems the pressure setting is approximately four times the normal operating pressure. At normal operating pressure, the excess spring load is absorbed entirely by the resilient seat. Since for proper initial seal at setting pressure, the annular area of the nozzle must be approximately ⅕ of the area of the nozzle, the resilient seat will be loaded by approximately 20 times the normal operating pressure.

It is an important object of this invention to eliminate these excessive stresses imposed upon the resilient seat in normal operation by making the sealing force a function of the pressure to be sealed. In the preferred embodiment the resilient sealing member is generally annular in form and is retained in a cavity within the movable valve member which has a shape similar to the sealing element. Stop means are provided between the movable and fixed elements and are so arranged that the deformation of the soft or rubber-like sealing member under spring pressure is limited to a predetermined and precisely controlled value less than the entire spring load. With the aforementioned structure there is little tendency for the pressure in the system to blow the rubber-like sealing member out of its normal position when the valve opens. The sealing force is made proportional to the pressure by forming internal cavities or undercuts in the sealing member which are exposed to the pressure within the valve and which are formed to extend radially beyond the valve seat proper so that an additional fluid pressure force will have the effect of causing the sealing member to engage the valve seat more securely. In this construction the spring may be set for a given opening pressure and the stop means arranged so that a relatively small initial deformation of the seal is affected by the hard seat of the nozzle. Thus, although the rubber seal does not carry the entire spring load, the valve does not leak as pressure rises because this pressure also increases the sealing engagement of the sealing member and the valve seat, and the average load on the seal during service is considerably less than in a valve wherein the seal is continuously subjected to a maximum load represented by the spring force. The principal object of this invention is to permit the accurate control of the amount of the fluid pressure force which acts to increase the engagement of the seal and the valve seat by providing a plurality of cavities having an area above the valve seat which in cooperation with the fluid pressure results in a sealing force dependent upon the fluid pressure. Since this area is critical in determining the rate and amount of the sealing force of the fluid it is desirable to provide a means wherein the amount of this area is not affected too greatly by slight inaccuracies in the dimensions of the undercut. Because the area resulting in the seating action of the fluid does not extend entirely around the valve seat slight inaccuracies in the depth of the undercut have legs effect upon the rate of the seating force.

Another object of this invention is to provide a sealing member which will not tend to elongate appreciably during the unseating operation of the seal member. By utilizing a plurality of cavities to supply the area subject to the fluid seating pressure instead of an annular undercut the applicant's sealing member has a plurality of lands between each cavity which effectively lift the sealing surface of the sealing member and prevent undesirable deformation of the sealing member during said unseating. The above mentioned lands also serve the purpose of imparting rigidity to the sealing member tending to prevent elongation and the wear resulting therefrom which decreases the life of the member.

Again it should be noted that a sealing member formed with the above mentioned lands enables the construction of a valve wherein the closing pressure may closely approach or even equal the opening pressure of the valve since little or no deformation is present to maintain the sealing engagement after the movable member of the valve begins to lift away from the fixed member.

The manner in which the aforesaid objects and advantages are accomplished will be more clearly understood from the following detailed description of a preferred embodiment of the invention.

In the drawings:

Fig. 1 is a sectional view of the sealing member mounted in a relief valve;

Fig. 2 is an enlarged bottom view of the sealing member; and

Fig. 3 is a longitudinal view in section along 3—3 of Fig. 2.

Referring to the drawings, Fig. 1 discloses a preferred embodiment of the valve seat element mounted in a relief valve composed of four main parts, a valve body 10, a valve cap member 11, a movable valve member 12 and a spring 13.

The valve body 10, having threads 15 for connection with the fluid pressure source, is formed with a first axial bore 14 having an internal reduced portion 16 opening into an enlarged bore 17 axially aligned with the first bore 14. A valve seat 18 is formed at the junction of the reduced bore 16 and the enlarged bore 17 and surrounds the reduced bore 16. The valve cap member 11 is attached to the valve body 10 by threaded means; however, any conventional method of attaching the valve cap member 11 to the valve body 10 is satisfactory as long as it provides axial adjustment of the two members. The openings 19 are formed in the valve cap member 11 to provide outlets for the escaping gas and a centrally located section 21 provides a surface against which the spring 13 abuts.

The movable valve member 12 is axially slidable in the bore 17 and is formed so as to permit the flow of fluids between said movable valve member 12 and the wall of the enlarged bore 17. In the preferred embodiment the movable valve member 12 is formed with an axial cavity closed at its lower end by the wall 22 which bears against the spring 13 at its lower end. Since the spring is compressed against the valve cap member 11 and the movable valve member 12, the spring exerts a force on the movable valve member 12 tending to move said member toward the valve body 10. The valve body is formed with a substantially radial surface 23 surrounding the valve seat 18 which engages a substantially radial surface 24 on the movable valve member 12 effectively forming a stop which limits the axial movement of said movable member 12 toward the valve seat 18.

The movable valve member 12 is formed with a substantially cylindrical cavity 26 at its lower end in which the sealing member 27 is secured by the annular lip 28 that extends below the sealing member 27. In the preferred embodiment of this invention the sealing member is formed having an annular shape and the cavity 26 is formed for a snug fit about the sealing member. This shape is not critical and any non-circular form could be employed providing the cavity 26 is formed so as to secure the sealing member 27.

The sealing member 27 may be formed of any suitable resilient material. However, it has been found that a member having a high modulus is desirable since such material limits the elongation when the valve is being opened while still providing good seating characteristics. In Fig. 2 a preferred embodiment of the sealing member 27 is shown wherein said member is of a cup-shaped form having a plurality of substantially radial cavities 29 extending from the central opening 31 of the cup-shaped sealing member 27 axially spaced from the open end 32 of said cup-shaped member. The surface 32 engages the valve seat 18 thus effectively sealing the bores 16 and 14 preventing any escape of the fluid when the valve is closed. The dotted line 33 denotes that portion of the surface 32 which engages the valve seat 18. It can be seen that an alternate form of the sealing member 27 would be provided if said member was formed of a cylinder having radially extending cavities opening into the lower face centrally located relative to the area of contact on said lower face with the valve seat.

Referring to Fig. 2 it can be seen that the cavities 29 extend beyond the dotted line 33 thereby forming an unbalanced area 34 which is exposed to the fluid pressure in the bore 16 thereby creating a downward sealing force which tends to increase the sealing engagement between the surface 32 and the valve seat 18.

The movable valve member 12 is formed with the surface 24 which engages the surface 23 of the valve body 10 as described above limiting axial motion of the movable valve member 12 toward the valve body 10. In the preferred embodiment of this invention the cavity 26 and the surfaces 23 and 24 are so proportioned that the sealing member 27 is not subjected to the full force of the spring 13 and a large portion of this force is absorbed by the surface 24 in engagement with the surface 23. By employing this type of construction the sealing member 27 is protected from excessive strain of the spring 13.

As the pressure within the bore 16 is increased it becomes necessary and desirable to increase the sealing engagement between the sealing member and the valve seat to prevent any leakage. Since the force created by the pressure acting on the unbalanced area 34 is directly proportional to the pressure within the bore 16 the sealing engagement between the sealing member and the valve seat increases as the fluid pressure increases. It should be noted that that portion of the surface 32 under the cavities within the dotted line 33 is subject to fluid pressure or both sides so the fluid pressure does not affect this portion.

Between the cavities 29 the internal wall of the central opening 31 is solid effectively forming lands 36 which stiffen the sealing member preventing undesirable elongation due to the downward fluid force as the valve opens. Since there is no surface above the lands 36 subject to fluid pressure the portion of the surface 32 below the lands is subject to fluid pressure which assists in preventing elongation of the sealing member during the unseating operation.

Since the unbalanced area 34 is not formed as an annular undercut slight variations in depth of the cavities 29 will not substantially affect the total of the unbalanced area 34 so this mode of construction has the advantage of permitting mass production wherein tolerances are not highly critical. It has been found that desirable results are achieved wherein the total of the unbalanced area 34 is equal to between 5 and 10% of the effective area of bore 16; however, this limitation may vary in other applications of this invention.

Although applicant has illustrated a preferred form of his invention, it will be recognized that various modifications in structural details may be made thereof without departing from the mode of operation and the essence of the invention. Therefore, except insofar as they are claimed in the appended claims, structural details of the valve may be varied widely without modifying the mode of operation of the invention. Accordingly, applicant contemplates that the appended claims and not the aforesaid detailed description be determinative of the scope of the invention.

What is claimed is:

A valve adapted to regulate compressible fluids under pressure comprised of a valve body formed with a bore subject to fluid pressure and a valve seat, a valve cap member which, in cooperation with said body, forms a chamber, a movable valve member within said chamber having a resilient valve seal arranged to engage said seat, and a spring extending between said cap member and said movable member biasing said movable member toward said seat, said movable member formed with a stop for engaging said body preventing said seal from assuming the entire force of said spring, said sealing member formed with an imperforate base adapted to engage said movable member, a substantially annular side wall, a flange extending inwardly from the open end of said side wall adapted to engage said seat, and a plurality of spaced lands extending from said flange to said base, said lands adapted to resist tension forces tending to move said flange away from said base, the portions between said lands providing unbalanced areas adapted to urge said flange toward said seat.

References Cited in the file of this patent

UNITED STATES PATENTS

| Number | Name | Date |
|---|---|---|
| 1,033,642 | Perry | Sept. 17, 1912 |
| 1,802,177 | Knight | Apr. 21, 1931 |
| 1,869,204 | Lowe | July 26, 1932 |
| 2,465,175 | Schwartz | Mar. 22, 1949 |
| 2,601,563 | Selwyn | June 24, 1952 |

FOREIGN PATENTS

| Number | Country | Date |
|---|---|---|
| 184,911 | Great Britain | May 31, 1921 |